United States Patent

Hubbard et al.

[11] Patent Number: 5,897,794
[45] Date of Patent: Apr. 27, 1999

[54] METHOD AND APPARATUS FOR ABLATIVE BONDING USING A PULSED ELECTRON

[75] Inventors: Richard F. Hubbard, Burke; Amnon Fisher, Alexandria, both of Va.

[73] Assignee: The United States of America as represented by the Secretary of the Navy, Washington, D.C.

[21] Appl. No.: 08/791,305

[22] Filed: Jan. 30, 1997

[51] Int. Cl.⁶ .................................................. B23K 15/00
[52] U.S. Cl. ............................. 219/121.12; 219/121.35; 228/107
[58] Field of Search ................... 219/121.12, 121.13, 219/121.14, 121.15, 121.35; 228/107; 148/524, 525, 565; 156/272.2; 427/551, 552, 596, 597; 250/492.3

[56] References Cited

U.S. PATENT DOCUMENTS

| | | | |
|---|---|---|---|
| 3,727,296 | 4/1973 | Cranston | 228/108 |
| 4,020,317 | 4/1977 | Colgate | 219/121.35 |
| 4,157,923 | 6/1979 | Yen et al. | 148/525 X |
| 4,535,219 | 8/1985 | Sliwa, Jr. | 219/121.14 X |
| 4,670,292 | 6/1987 | Fujita et al. | 250/492.3 X |
| 4,684,781 | 8/1987 | Frish et al. | 427/554 X |
| 5,146,063 | 9/1992 | Inokuti | 219/121.35 |
| 5,155,325 | 10/1992 | McCleaf et al. | 219/121.64 |
| 5,599,468 | 2/1997 | Mako et al. | 219/121.14 |

FOREIGN PATENT DOCUMENTS

| | | | |
|---|---|---|---|
| 2-303689 | 12/1990 | Japan | 219/121.35 |

OTHER PUBLICATIONS

Turman et al., "Electron beam joining of structural ceramics" Sandia Report SAND95–0595, Albuquerque NM, Apr. 1995.

*Primary Examiner*—Gregory L. Mills
*Attorney, Agent, or Firm*—Thomas E. McDonnell; John J. Karasek

[57] ABSTRACT

A method and apparatus for bonding a layer of coating or cladding material onto a substrate with minimal bulk heating of the substrate. A pulsed electron beam generator is used to produce high energy electrons at the beginning of the pulse and a larger number of lower energy electrons at the end of the pulse. A thin sacrificial or ablative layer of an easily-vaporized material such as tin is placed on top the coating. The high energy electrons penetrate through the ablative and coating layers and heat the coating-substrate interface. The ablative layer is then heated by the low energy electrons to a much higher temperature, causing it to vaporize. The ablation process generates a force on the coating layer which drives it into the substrate.

21 Claims, 3 Drawing Sheets

METHOD AND APPARATUS FOR ABLATIVE BONDING USING A PULSED ELECTRON

BACKGROUND OF THE INVENTION

The present invention generally relates to the field of laminate coatings and more particularly, is directed to a method and apparatus for bonding or cladding a layer of material onto a substrate with minimal bulk heating of the substrate.

There are a variety of techniques known in the prior art for bonding or cladding a layer of dissimilar material onto a substrate. Known techniques which produce enhanced bonding between the coating and the substrate include:

1. Static processes;
2. Thermal spray processes;
3. Conventional and explosive welding; and
4. Laser, microwave and electron beam joining.

Static process techniques include such conventional approaches as adhesive joining, cladding and brazing. Simple adhesives are, however, impractical in many cases while conventional cladding usually involves the simultaneous application of intense heat and pressure. This is a slow process which results in considerable bulk heating of the substrate. In brazing, a heat-absorbing brazing material is placed between the coating and the substrate. Conventional brazing again causes substantial heating of the substrate and often produces a relatively weak bond.

Thermal spray processes are widely used to apply coatings, particularly in cases where the coating does not bond well to the substrate. The typical thickness of such coatings is 100 microns. The process typically involves heating the coating material in powder form to molten temperatures and blasting it onto the substrate at speeds of 500 m/s. Thus, both heat and pressure (in the form of the droplet kinetic energy) is involved in the bonding process. Although this technology has been available commercially for decades, and the coating quality can be excellent, the capital cost of devices such as plasma sprayers and detonation guns is substantial. The processing cost of such coatings commonly exceeds a dollar per square inch. Also, the process is not appropriate if the applied layer is already in the form of a plate or film (i.e., for cladding). The terms "coating" and "cladding" although sometimes used interchangeably, more properly refer to different application processes. Cladding refers to bonding a plate or film to a workpiece, while coating refers to a bonding process that also changes the form of the material being bonded (e.g., applying liquids or powdered solids to a workpiece). Preferably, an improved bonding process will work for both coating and cladding applications.

If the coating and substrate are metallurgically compatible or "weldable", then conventional welding techniques may be used. This process is sometimes referred to as fusion hardfacing. Fusion hardfacing cannot be used in cases where the substrate cannot be heated or the materials are not weldable. Difficult to weld materials such as titanium can often be bonded to other materials by an explosive welding process. A small amount of high explosives is used to accelerate a flyer plate which drives the materials together. However, explosive welding is often not suitable to high volume processing, and there is little control over the process.

Many bonding processes involving advanced heat sources such as lasers, microwave, and electron beams have been proposed, but few are used commercially. Both lasers and continuous (DC) electron beams have been used for fusion hardfacing. Lasers are relatively inefficient and must rely on thermal conduction to heat the coating-substrate interface unless the coating is transparent to the laser. Microwaves are similar to electron beams in that they can produce rapid heating into the depth of the coating layer, provided that the coating is not highly conducting. Although these processes produce controlled, localized heating, they do not in general produce the additional pressure which is often required for a strong bond between dissimilar materials. In addition, most are not suitable for high volume industrial applications.

SUMMARY OF THE INVENTION

For the above reasons, there is a need in the prior art for an improved method and apparatus for coating or cladding a layer of material onto a substrate with minimal bulk heating of the substrate.

Accordingly, it is the overall object of the present invention to provide an improved method of coating or cladding a layer of material onto a substrate which overcomes the above noted disadvantages of such methods known in the prior art.

It is a specific object of the present invention to provide an improved method of bonding a layer of material to a substrate which is more efficient than such methods known in the prior art with respect to the results achieved.

It is a still further specific object of the present invention to provide an improved method of bonding a layer of material to a substrate that is potentially lower in cost than plasma sprays.

It is a still further specific object of the present invention to provide an improved method of bonding a layer of material to a substrate which can be used with many more types of materials than such methods known in the prior art, including powders, plates, films, liquids, metals, ceramics, and composites.

It is a still further specific object of the present invention to provide an improved method of bonding a layer of material to a substrate which can be used in much higher volume applications than many of the methods known in the prior art.

It is a still further specific object of the present invention to provide an improved method of bonding a layer of material to a substrate from a layer of material at a standoff distance from the substrate.

It is another object of the present invention to provide an improved method of bonding a layer of material to a substrate which provides greater process control, minimal substrate heating, and superior bonding strength in comparison to such methods known in the prior art.

These and other objects of the present invention are achieved by a combination of rapid in-depth heating and pressure generated by a pulsed electron beam. The method can be applied to many coating layer materials, including metals, alloys, ceramics, polymers, and composites. The coating can also be in the form of a thin plate, a film, or a powder, and may have a brazing layer between it and the workpiece. The typical electron beam source used in accordance with the method of the invention has a peak energy of 50–500 keV, a pulse length of 1 microsecond, and peak currents of 0.1–10 kA.

The invention uses a pulsed electron beam generator which produces high energy electrons at the beginning of the pulse and a larger number of lower energy electrons at the end of the pulse. A thin sacrificial layer of an easily-vaporized material such as tin is placed on top of the coating.

The high energy electrons penetrate through the sacrificial layer and the coating layer, heating them to a molten temperature in a fraction of a microsecond. The lower energy electrons are stopped by the sacrificial layer, causing it to ablate or vaporize. The ablation process generates a force or pressure pulse on the coating which drives it into the substrate. The bond type which is formed is primarily mechanical and is referred to as a nonfusion bond since the coating and substrate do not form a solid solution.

Alternatively, two separate pulsed electron beam generators may be used instead of a single pulsed electron beam generator: one electron beam generator for generating a pulse of high energy electrons, and one electron beam generator for generating a higher current pulse of lower energy electrons. The advantage of this approach is that it may be simpler and more cost effective to provide two pulsed electron beam generators, each being optimized to its particular function, rather than providing a single electron beam generator that must adequately perform both of these functions.

The coating process of the invention can be optimized by adjusting the time history of the beam energy and current to localize the energy deposition and control the temperature of the sacrificial and coating layers. However, the success of the process is not sensitive to the details of the beam tuning.

The coating method of the invention was demonstrated by bonding a molybdenum layer to a titanium substrate using tin as the ablator. The tin appeared to be completely vaporized by low energy electrons at the end of the beam pulse. No bonding was produced when the tin ablator was removed.

Until very recently, pulsed electron beam technology has been generally considered too expensive and unreliable for most industrial applications. However, recent advances in developing pulsed electron beam sources with high repetition rates, lower capital cost, high average power, and improved reliability make commercialization of this technology now feasible. The techniques can be used in high volume processing involving average beam powers of tens or hundreds of kilowatts.

BRIEF DESCRIPTION OF THE DRAWINGS

The present invention will now be described with reference to the drawings in which.

DETAILED DESCRIPTION OF THE PREFERRED EMBODIMENT

Figure 1:
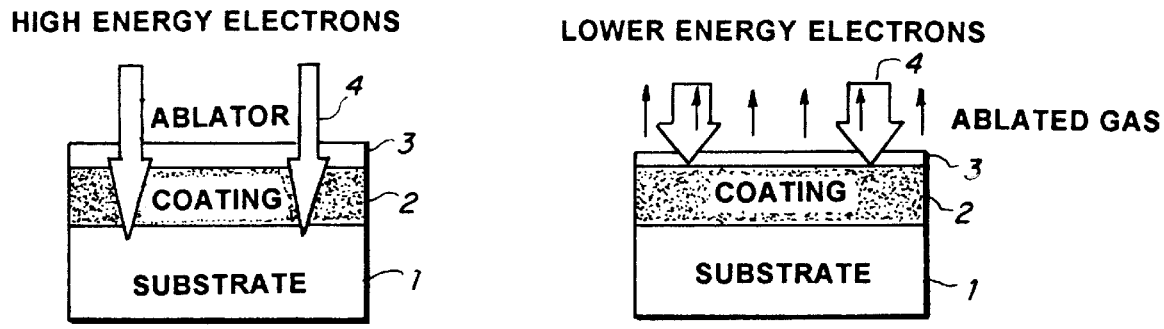
FIG. 1 provides an overview of the ablative bonding process in accordance with the present invention.

The method of the present invention is illustrated in FIG. 1. FIG. 1 shows a substrate 1 to which a coating 2 is applied through an ablator layer 3. Layer 3 is a thin sacrificial layer of an easily-vaporized material such as tin which is placed on top of coating 2. High energy electrons 4 penetrate through ablator layer 3 and coating layer 2, heating them to a molten temperature in a fraction of a microsecond. The lower energy electrons are stopped by the ablator layer 3, causing it to ablate or vaporize. The ablation process generates a force or pressure pulse on coating 2 which drives it into substrate 1. The bond type which is formed is primarily mechanical and is referred to herein as a nonfusion bond since coating layer 2 and substrate 1 do not form a solid solution.

Figure 2:
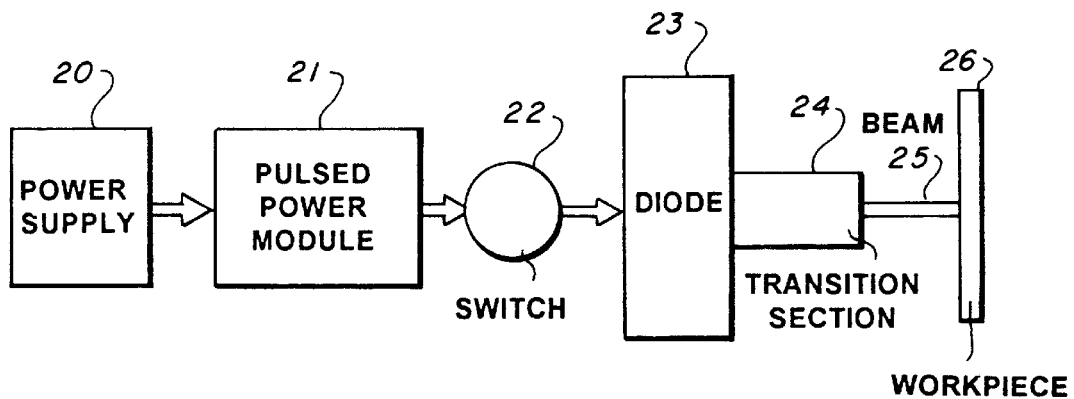
FIG. 2 is a block diagram of the components used to implement the ablative bonding method of the present invention.

The components which form the pulsed electron beam source which performs the method of the present invention are illustrated in FIG. 2.

These components include a power supply 20 which supplies electrical power to pulsed power module 21 which in turn provides pulse shaping and voltage multiplication. Power module 21 also includes a control device (not shown) which controls the generation of the pulse. An output switch 22 directs the pulse to a diode 23 where electrons are generated at the negative cathode and flow towards the positive anode. Alternatively, output switch 22 may be placed ahead of some of the pulsed power components.

An optional transition section 24 may be used to provide additional beam focusing. Electromagnets can be used to form transition section 24 so that electron beam 25 can be focused on workpiece 26.

The cathode and anode of diode 23 must remain in a high vacuum to avoid electrical breakdown. In the simplest configuration, workpiece 26 is also under vacuum, so the focusing and beam transport can be more easily made. If workpiece 26 is in air or some other dense working gas, then transition section 24 must also provide a suitable vacuum/gas transition. In a one-time use of the method of the invention, a vacuum/gas transition could be formed of a thin foil. However, a practical repetitively-pulsed device would require a differential pumping section since the foil would be destroyed by the beam. Differential pumping devices permit the gas pressure to be much higher at the workpiece than in the diode.

Figure 3:
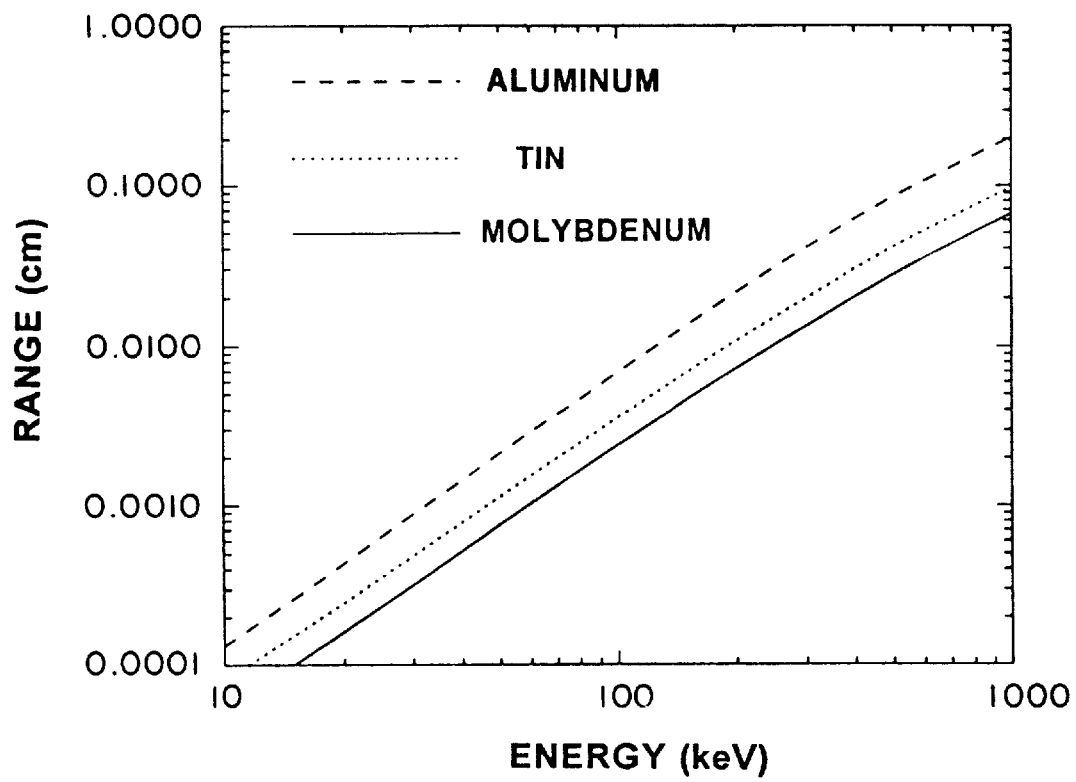
FIG. 3 is a graph showing the electron penetration range in various materials as a function of initial electron beam energy.

Although there are a number of physical processes involved in the generation and transport of the electron beam, the ablative bonding process primarily involves the reaction of the workpiece to the beam electrons. Energetic electrons lose energy continuously as they pass through dense material. This energy is deposited into the workpiece in the form of a temperature rise and an increase in internal energy. The depth or range into the material at which electrons lose all their energy is plotted as a function of initial energy $E_0$ for several materials in FIG. 3. A 50 keV electron has a range R of approximately 10 microns in most solid materials. The range typically increases by a factor of 15 when the beam energy is raised to 250 keV.

The temperature increase $\Delta T$ arising from the energy deposited in the workpiece can be estimated from the specific heat $C_v$ and stopping power $dE/dx'$ of the material and the energy fluence $F_b$ of the beam. The stopping power is typically ~1.5 Mev-cm$^2$/g for a 250 keV electron beam and ~4 MeV-cm$^2$/g at 50 keV. If the current density $J_b$ and voltage $V_b$ are constant during the pulse, then $F_b = J_b V_b \tau_p$, where $\tau_p$ is the duration of the pulse. If the temperature T remains below the melting point $T_m$, the workpiece thickness x is much smaller than R, and thermal conductivity and radiation losses are neglected, then $\Delta T = F_b dE/dx'/C_v$. The specific energy $\epsilon_{d1}$ deposited in the material, which is usually expressed in Joules/g, is approximately $\epsilon_{d1}=F_b(dE/dx')/W_0$, where $W_0$ is the beam energy. The situation is somewhat more complicated if $R<\Delta x$ since $dE/dx$ increases rapidly at the end of the range. In this case, the specific deposition is approximately $\epsilon_{d2}=F_b/R'$, with the reduced range R' usually expressed in g-cm. Once the material is raised to the melting or vaporization temperature, additional energy is required to complete the phase change to the next state. For many materials, the energy required to overcome this heat of vaporization barrier is substantially larger than the energy required to raise T from room temperature to the vaporization temperature $T_v$.

Ideally, the parameters of electron beam 25 are chosen so that the first part of the pulse penetrates through ablator layer 3 and coating layer 2, heating both to near the melting temperature. This typically requires a specific deposition of several hundred J/g. Due to a process called impedance collapse, the later part of the pulse has a much lower voltage but higher current, so most of those electrons are stopped in the ablator. (In most electron beam devices, impedance collapse is strongly undesirable, and a crowbar switch is added to prevent the burst of low energy electrons at the end of the pulse; however, these electrons are essential to the bonding process in the present invention.) Thus, the specific deposition in the ablator can be substantially higher than in the coating or substrate.

Complete vaporization of the ablator layer requires more than 10 kJ/g for many materials. However, tin has a low heat of vaporization and requires only 2.5 kJ/g for complete vaporization, so it is a useful material for a demonstration experiment.

If most of the beam energy is absorbed in the ablator, the heated vapors provide a pressure pulse which drives the coating and substrate together. An estimate of the average pressure is given by $<P>=V_r\rho_s\Delta x_{ab}/\tau_{ab}$, where $v_r$ is the "rocket" exhaust velocity of the vaporized material, $\rho_s$, is the solid density of the ablator, $\Delta x_{ab}$ is the ablator thickness, and $\tau_{ab}$, is the duration of the low energy, high current "tail" of the electron pulse which provides most of the heating to the ablator. More detailed theoretical treatments of this process can be made using hydrodynamic computer codes. Such codes have been extensively used to study inertial fusion targets. Pressures of several kbar are required to duplicate the impact associated with typical thermal spray process.

Figure 4:
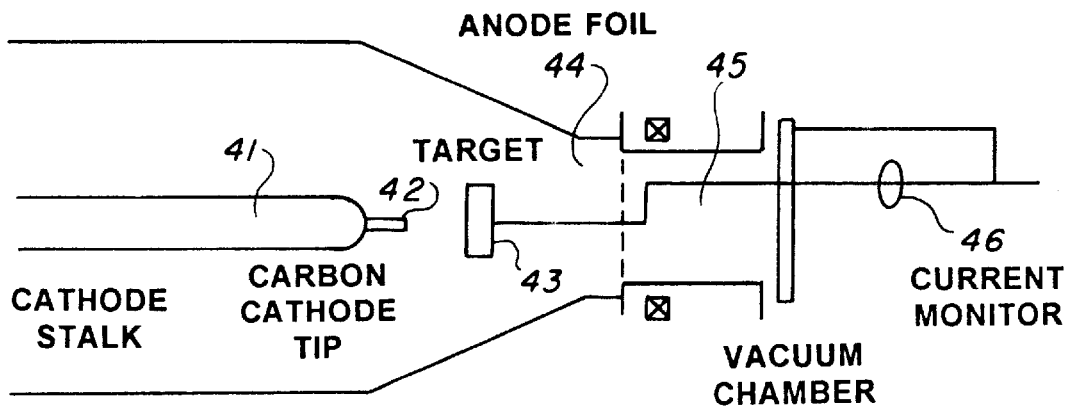
FIG. 4 is a block diagram illustrating one embodiment of the ablative bonding method of the present invention, corresponding to an apparatus used in a proof-of-principle experiment.

A simple proof-of-principle of the present invention was performed using a long pulse electron beam. The arrangement is shown schematically in FIG. 4 and includes a cathode stalk 41, carbon cathode tip 42, target 43, anode foil 44, vacuum chamber 45 and current monitor 46. Current monitor 46 monitors the level of current in target 43.

The electrons were transported in a vacuum, and the workpiece was mounted directly on the anode. The workpiece consisted of three thin strips: a tin ablator, a molybdenum "coating", and a titanium substrate. Each strip was approximately 0.5 mil (12.5 microns) thick. The workpiece was mounted on a square 6.25 cm$^2$ carbon block.

Figure 5:
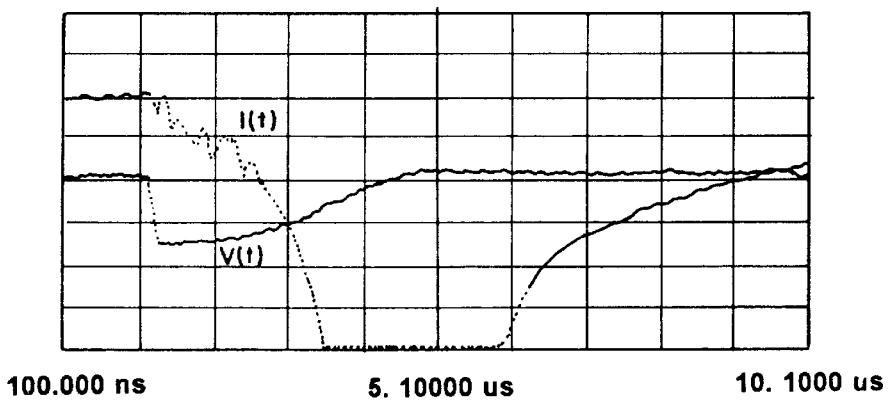
FIG. 5 is graph showing experimentally-measured voltage and current vs time from the ablative bonding embodiment illustrated in FIG. 4.

The beam voltage and current traces are shown in FIG. 5. The main part of the pulse had a voltage of 240 kV, a current of 300 A, and a duration of 1.5 $\mu$sec. The crowbar switch which normally minimizes impedance collapse was disabled. As the voltage collapsed in the tail of the pulse, the current exceeded 1.5 kA, and the voltage steadily decayed to ten of kilovolts. The fluence is estimated to be 17 J/cm$^2$ in the main part of the pulse and 20–25 j/cm$^2$ in the lower voltage tail. Electrons during the main part of the pulse would have penetrated through to the substrate, depositing only a few hundred J/g in the molybdenum coating. An additional deposition of several hundred J/g probably occurred as the voltage dropped down to ~100 kV. Most of the deposition in the tin ablator probably occurred late in the pulse when the voltage V(t) was between 40 and 100 kV.

Figure 6:
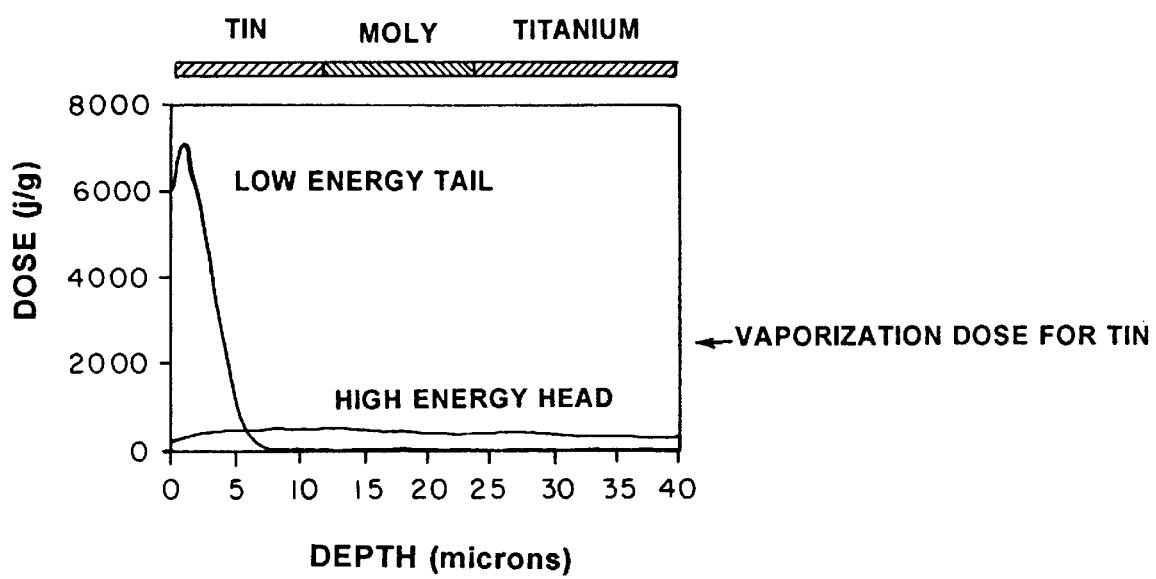
FIG. 6 is graph plotting a theoretical calculation of specific energy in joules per gram against depth for the embodiment illustrated in FIG. 4, and the data from FIG. 5.

More detailed estimates of the specific deposition for this case were made using a widely-used Monte Carlo computer simulation model which traces the energy loss and scattering of a large number of electrons in the 6.25 cm$^2$ solid target. For simplicity, the electron beam is represented as having two components: a high energy head with an energy of 240 keV, a current of 300 A and duration of 1.5 $\mu$sec, and a lower energy beam tail with an energy of 50 keV, a current of 2000 A and a duration of 1.5 $\mu$sec. FIG. 6 plots the specific energy or "dose" in joules per gram against the depth onto the target for both beam components, as predicated by the Monte Carlo model. Also shown is the depth corresponding to the tin ablator, the molybdenum cladding layer, and the titanium substrate. The high energy component penetrates well into the substrate, producing a specific deposition of 300–400 J/g. The low energy beam tail penetrates only a few microns into the tin, but has a peak specific deposition of over 7000 J/g. This is well above the 2500 J/g required to vaporize the tin. Since the actual beam energy and current vary continuously during the pulse, the actual deposition profile is some complicated combination of the two curves shown in FIG. 6. This computer model result is consistent with the experimental results and with the interpretation of those results herein.

Examination of the workpiece revealed that the titanium and molybdenum had bonded together. The sacrificial tin layer appeared to have been completely vaporized. A similar experiment with the tin layer removed showed no evidence of bonding. Because of the much higher vaporization temperature and heat of vaporization of molybdenum compared with tin, much less vaporization would have occurred, and the pressure pulse would have been much weaker. This suggests that the force provided by the ablation process was crucial to forming a strong bond.

When compared to the prior art coating processes, e.g., the static process described above, the electron beam ablative bonding method of the present invention offers much more process control, minimal substrate heating, and superior bonding strength. Thermal spray coatings are typically applied at rates of a few cm$^2$/s and require that the coating be in a powder form. Electron beam ablative bonding can have a much higher throughput and can also permit cladding of thin sheets as well as powders onto a substrate. Conventional welding hardfacing techniques are inexpensive but slow, and cannot be used with nonweldable materials. Explosive welding can eliminate the weldability constraints, but the process is cumbersome and difficult to control. Laser, microwave, and DC electron beam joining all have limitations which were discussed above.

None of the prior art methods use the pressure pulse employed in e-beam ablative bonding and thus may encounter difficulties in bonding dissimilar materials. The ablative bonding technique of the present invention is inherently more efficient and can more easily be employed in high throughput applications.

In general, it is simpler to transport the electron beam in a vacuum as was described above. Direct current electron beam devices usually do not operate in full density air or other shielding gases because the beam scatters and loses energy quickly in the air, and contamination from the workpiece vapors can damage the cathode. A vacuum-air interface, usually a differential pumping apparatus referred to as an aerodynamic window, maintains the high vacuum required in the electron source. However, pulsed electron beams can often be transported in a self-pinched state through dense gases, thus minimizing beam expansion. In addition, since the fraction of time or duty cycle during which the beam is turned on is small ($<10^{-3}$ in most cases), the window can be shuttered between pulses. This should reduce pumping requirements and reduce the flow of workpiece vapors back into the electron source.

The electron beam system described above with respect to FIG. 2 encompasses a variety of beam source options. The details of the beam source are not important provided that the beam source can produce a current and energy history which matches the thickness of the ablator and coating layers.

In demonstrating the present invention, the applicants used a single pulse, long pulse modulator and a carbon fiber cathode. In high average power versions, such a device would require switches capable of operating at repetition rates of 10–1000 Hz. Several options exist for switches, including spark gaps, thyratrons, and solid state devices, and there has been considerable recent progress in improving the reliability and life cycles of both thyratron and solid state switches. Carbon fiber cathodes are not essential, but they appear to be particularly well-suited to industrial applications because they can survive for many pulses ($>>10^6$), are relatively insensitive to poisoning and vacuum constraints, and can produce longer pulses without collapsing than most other designs. It may also be desirable in some cases to have separate high and low voltage electron beam sources, rather than relying on complex pulse shaping from a single beam source.

The ablator layer can in principle be any easily-vaporized material (such as water ice or dry ice) which is thick enough to stop most of the low energy electrons at the tail of the pulse while allowing the high energy electrons to heat the coating. Metals such as tin and zinc as well as certain organics such as polyethylene or phenols appear to be suitable for most applications. Thermal spray coatings encompass a very wide array of materials, including metals, alloys, ceramics, and carbides. The same coatings can be applied to virtually any substrate because the process normally heats the substrate by less than 300°. Electron beam ablative bonding has similar flexibility.

Many variations and modifications of the above described embodiments of the present invention will become apparent to those of ordinary skill in the art from a reading of this disclosure. It should be realized that the invention is not limited to the particular apparatus disclosed, but its scope is intended to be governed only by the scope of the appended claims.

We claim:

1. An apparatus for bonding a layer of material onto a substrate, said apparatus comprising:

a power supply for supplying electrical power;

a power module coupled to said power supply for generating an electrical pulse of a predetermined shape and amplitude;

a diode coupled to said power module for receiving said pulse and directing a corresponding electron beam pulse to a workpiece having a coating to be bonded to said workpiece and a ablative layer of material on top of said coating, said beam pulse being used to vaporized said ablative layer in order to promote the bonding of said coating to said workpiece; and a control device coupled to said power module, wherein said control device controls said power module to generate said beam pulse with a plurality of high energy electrons at the beginning of said beam pulse and a plurality of lower energy electrons at the end of said beam pulse, the quantity of said high energy electrons being greater then the quantity of said lower energy electrons at the beginning of said beam pulse and being less than the quantity of said lower energy electrons at the end of said beam pulse.

2. The apparatus of claim 1, wherein said diode and said workpiece are maintained under a vacuum while said beam pulse is acting on said work piece.

3. The apparatus of claim 2, wherein the vaporization of said ablative layer produces a pressure on said coating which forces said coating into said workpiece.

4. The apparatus of claim 1, wherein said control device controls said power module to generate said beam pulse with a predetermined and fixed duration.

5. The apparatus of claim 1 further including a transition element between said diode and the workpiece for focusing said beam pulse onto said workpiece.

6. The apparatus of claim 5, wherein said transition piece includes at least one electromagnet for focusing said beam pulse.

7. The apparatus of claim 1, wherein said diode and said workpiece are maintained under a vacuum while said beam pulse is acting on said workpiece.

8. The apparatus of claim 1, wherein said ablative layer comprises a material selected from the group consisting of tin, zinc, polymers, water ice, and frozen $CO_2$ (dry ice).

9. The apparatus of claim 1, wherein said ablative layer comprises a material selected from the group consisting of phenols and polyethylenes.

10. The apparatus of claim 1, wherein said beam pulse has a voltage of at least 240 kV.

11. The apparatus of claim 10, wherein said beam pulse has a current of at least 250 amps.

12. The apparatus of claim 11, wherein said beam pulse has a duration of at least one microsecond.

13. A method for bonding a layer of material onto a substrate, said method including the steps of:

providing a power module for generating an electrical pulse of a predetermined shape and amplitude;

providing a control device for said power module in order to control the generation of said electrical pulse;

providing a diode for receiving said pulse and directing a corresponding, electron beam pulse to a workpiece having a coating to be bonded to said workpiece and an ablative layer of material on top of said coating; and controlling said power module to generate said beam pulse with a plurality of high energy electrons at the beginning of said beam pulse and a plurality of lower energy electrons at the end of said beam pulse, the quantity of said high energy electrons being greater than the quantity of said lower energy electrons at the beinning of said beam pulse and being less than the quantity of said lower energy electrons at the end of said beam pulse, wherein said beam pulse causes said ablative layer to be vaporized in order to promote the bonding of said coating to said workpiece.

14. The method of claim 13, further including the step of controlling said power module to generate said beam pulse with a predetermined and fixed duration.

15. The method of claim 14, further including the step of maintaining said diode and said workpiece under a vacuum while said beam pulse is acting on said workpiece.

16. The method of claim 15, further including the step of controlling said power module to generate said beam pulse at a voltage of at least 240 kV.

17. The method of claim 16, further including the step of controlling said power module to generate said beam pulse with a current of at least 250 amps.

18. The method of claim 17, further including the step of controlling said power module to generate said beam pulse for a duration of at least one microsecond.

19. The method of claim 13, wherein said workpiece further comprises a brazing layer under said coating.

20. An apparatus for for bonding a layer of material onto a substrate, said apparatus comprising:

means for directing a first electron beam pulse to a workpiece, said workpiece having a coating of said material to be bonded on said workpiece, and having an ablative layer of material on said coating, wherein said first electron beam pulse is adapted for heating said coating to a molten temperature; and means for directing a second electron beam pulse to said workpiece, wherein said second electron beam pulse is adapted for vaporizing said ablative layer, thereby promoting bonding of said coating to said workpiece.

21. The apparatus of claim 20, wherein said workpiece further has a layer of brazing material disposed between said coating and said workpiece.

* * * * *